United States Patent Office 3,846,229
Patented Nov. 5, 1974

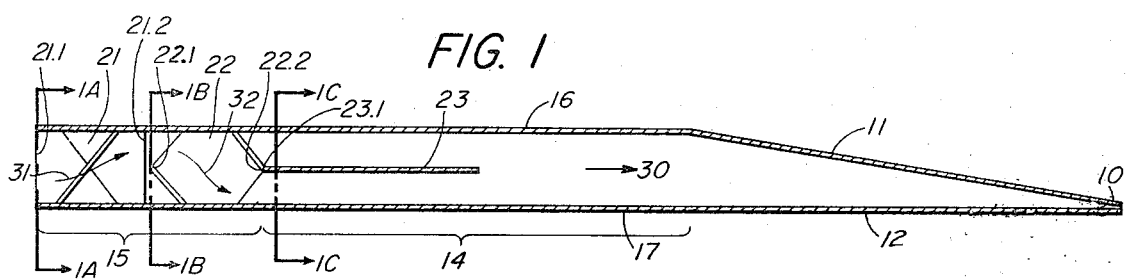
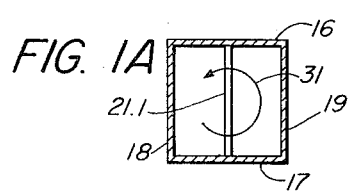
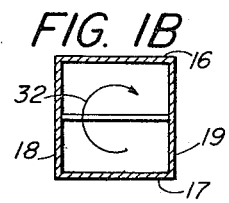
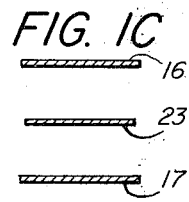
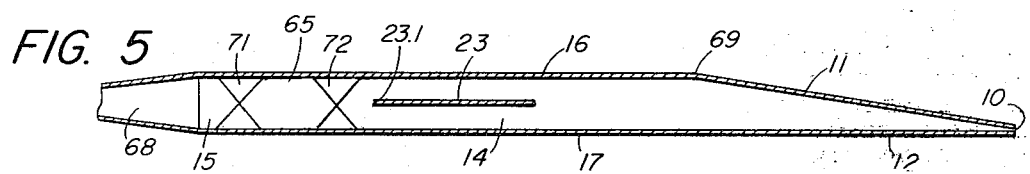
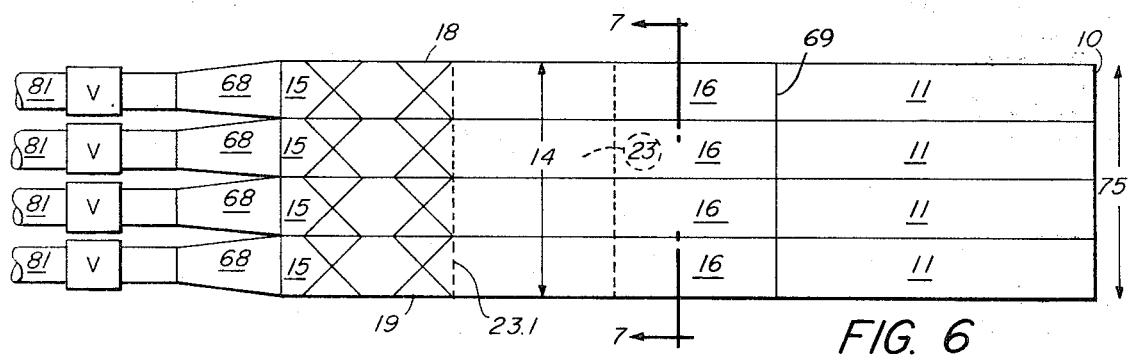
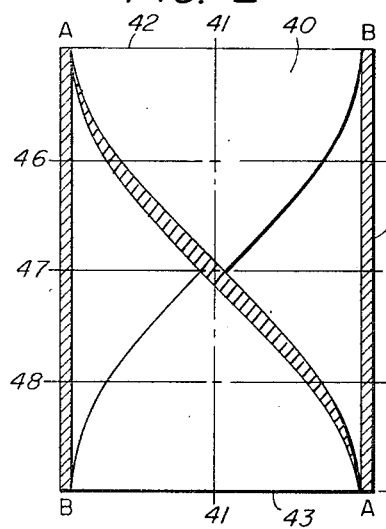
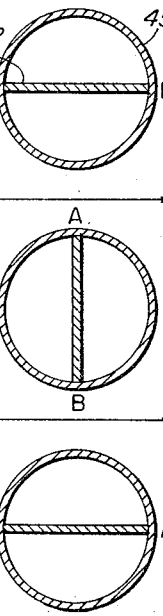
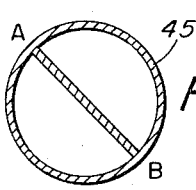
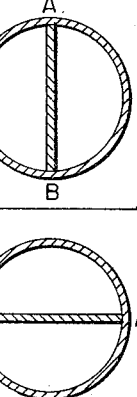
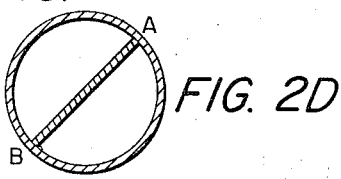
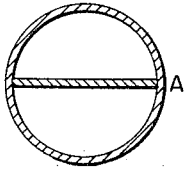

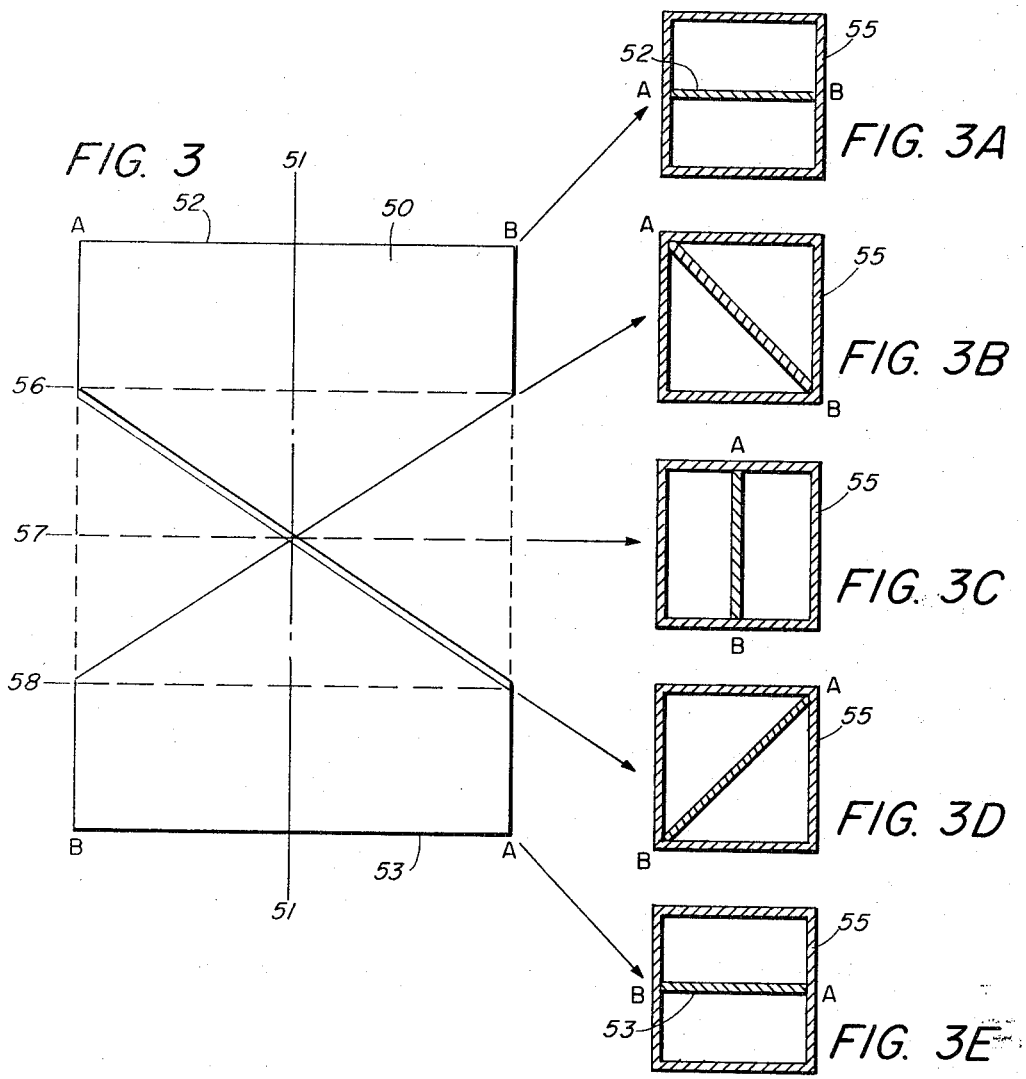
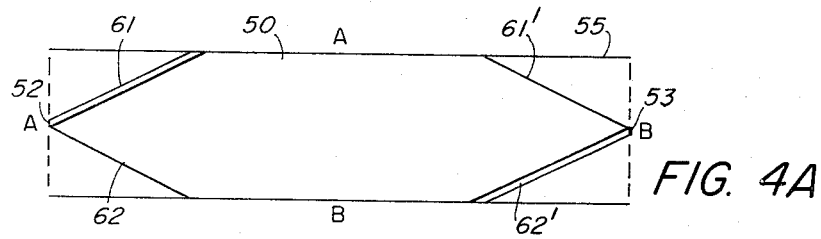
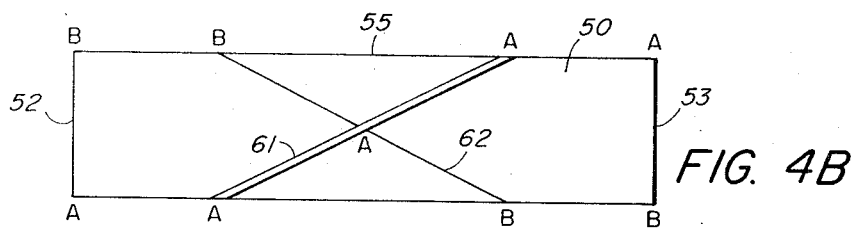

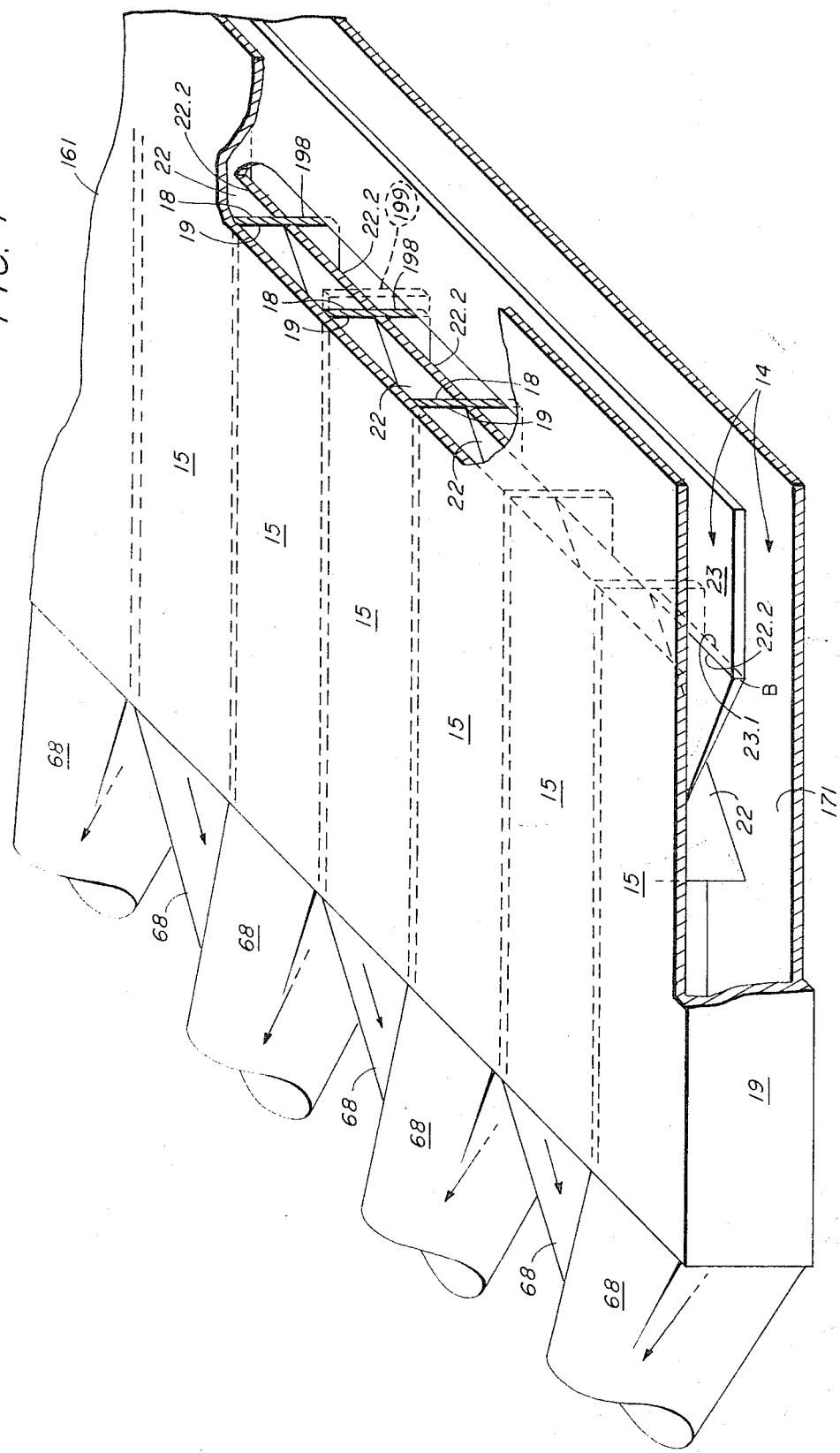

3,846,229
FLOW SYSTEMS FOR INDUCING FINE-SCALE
TURBULENCE
Otto Julius Kallmes, Marblehead, Mass., assignor to
Lodding Engineering Corporation, Auburn, Mass.
Filed Jan. 28, 1972, Ser. No. 221,555
Int. Cl. D21f 1/06; F15d 1/02
U.S. Cl. 162—216                                29 Claims

ABSTRACT OF THE DISCLOSURE

The disclosure describes a method and a flow system for supplying a plup slurry or stock to a paper making machine. A flow of stock is established in a plurality of parallel flow paths wherein both large-scale currents and exceptionally intense fine-scale turbulence are induced into the stock. The flows from the parallel flow paths are combined in a short pre-slice flow chamber in which the large scale currents are eliminated without significant diminution of the fine-scale turbulence. The stock flow is then discharged through a slice in the form of a wide flat jet which is extremely stable, which still contains an exceptionally high degree of fine-scale turbulence to keep the fibers within it extremely well dispersed, and which is substantially devoid of cross-currents.

BACKGROUND OF THE INVENTION

This invention relates to the handling of fluid slurries and is more particularly directed to maintaining fibers dispersed as uniformly as possible in pulp slurries for papermaking and like processes.

It is now generally accepted, with substantial theoretical and practical support, that to form a sheet of paper of maximum uniformity, it is necessary to have a high degree of fine-scale or micro-turbulence in the furnish which is delivered through the slice to the forming wire. In most papermaking systems, however, the pulp slurry resides in a quiescent state in a headbox for 5–30 seconds prior to being discharged through the slice. The purpose of this quiet period is to eliminate the large scale eddy currents in the stock; these result from the discharge of the stock from the manifold into the headbox. But, while these large-scale currents are being broken down, the micro-turbulence within the stock is dissipated as well, and large clumps or flocs of fibers are formed. If these flocs are not destroyed or kept to a minimum by one or more of a variety of means, they show up in the final sheet in the form of gross non-uniformities. The relative ineffectiveness of the various means in widespread use for preventing flocculation was dramatically illustrated in a recent study (Corte & Dodson, Das Papier 23:381 (1969) and 24:260 (1970)). In these articles, it was shown that the localized variance of the basis weight (i.e.: from square millimeter to square millimeter) of commercial papers is generally an average of 400% larger (25% to 1300%) than that of ideally uniform sheets (i.e.: those with a truly random fiber disposition in the plane of the sheet) formed from the same fiber populations.

In addition to flocs, the jets discharged from most headboxes often contain relatively large eddy-currents and vortices which ultimately show up as long machine direction (MD) streaks of high and/or low basis weight in the finished papers. Such currents obviously are undesirable as well.

THE PRIOR ART

Prior stock flow systems predominantly include a headbox in which the stock resides in a relatively quiescent state just prior to the slice, and some of the closed stock inlet variety in which the stock slurry is pumped through conduits to the slice.

Prior attempts to establish and maintain the fibers in the stock dispersed as uniformly as possible in the portion of the headbox wherein the stock flow is relatively quiescent prior to its deposition through the slice onto the forming surface have involved employment of such complicated auxiliary equipments as perforated rotary rolls, commonly referred to as rectifier rolls, holey rolls, or silencing rolls, and other mechanical vibrating, shaking and stirring devices. All of these devices induce turbulence of a much greater scale but lower intensity than that required to maintain the fibers dispersed as uniformly as possible within a pulp slurry, and far too little of the much more desirable micro-turbulence. The net result is that the fibers of most stocks do form relatively large flocs which, when deposited on the forming surface, result in undesirable localized irregularities of high and low basis weight in the finished sheet. It has therefore been conventional in addition to employ means in combination with the forming wire, for instance, table rolls and/or foils under the forming wire, to further homogenize the stock which means are characterized, however, by a significant lack of control over the formation quality of the paper sheet. In fact, the mark of a good papermaker is how successfully he can minimize the mass variations in the finished sheet, both on a micro- and a macro-scale.

Solutions proposed to these various problems cited above have taken many, sometimes seemingly contradictory, directions. In headbox systems employing a pond, the holey roll is, of course, well known. A rotatable unit for producing cross-currents in the pond is shown in U.S. Pat. 3,224,929. An effort to eliminate moving members in the pond employing bands of rods (sometimes called "soldiers") in the slurry flow path for generating turbulence in the slurry is shown in Parker 3,092,540. Bücking, as early as 1925 in Pat. No. 1,610,742, proposed to furnish the pond with slurry through a set of up-flow vertical conduits opening into the bottom of the pond and containing spiral deflectors in them for giving the slurry a whirling motion in the plane of its surface in the pond.

Parker and Schmaeng in 3,220,919 proposed using shaped rod turbulence generators (soldiers) in a tapered approach to the slice opening. Others, on the other hand, have appreciated a need for rectifiers in the slice nozzle. Among them, Mason et al. in U.S. Pat. 1,552,629, shows rectifier baffles located vertically (i.e.: perpendicular to the cross-machine direction) in the flow path to the slice. Essentially similar nozzle rectifiers are shown in Bell-Irving et al. 1,909,150 where FIGS. 10–16 inclusive illustrate several embodiments of vertically oriented nozzle rectifiiers. The Bell-Irving patent also suggests a form of cross-machine direction (CMD) basis weight control through the use of pipes for adding white water to selected portions of the flow between the rectifiers.

The concepts seen in the Mason et al. and Bell-Irving et al. patents are carried forward in the flow control apparatus of Lee 2,684,690, and in closed stock inlet flow systems that are disclosed in Sieber 3,098,787; and Lopas 3,351,522. In the Sieber patent, the Venturi flow concept appearing in FIG. 5 of Bell-Irving is employed, while in both the flow is essentially guided by baffles oriented perpendicularly to the cross-machine direction. In Pat. No. 3,076,502 Robinson, a predecessor who assigned to the same assignee as Sieber and Lopas, proposed a flow distributor which divides stock flow from a single inlet duct to a plurality of side-by-side rectangular ducts constituting a flow spreader with outlets positioned across the intake of the slice. This arrangement appears to have inherent problems of uneven flow. A somewhat similar concept appeared earlier in the pump headbox of Goumeniouk 2,894,581.

The use of restricted passages to create turbulence through friction between the slurry and the side walls defining the passages was recognized in Bennett Pat. 2,737,087, where a bank of tubes providing restricted passages precedes a pond which is followed by a slice. The Burgess Jr. et al. and Notbohm Pats. 3,328,236 and 7, illustrate an extension of Bennett's ideas to the bunched-tube approach to the slice. A variation on the bunched-tube approach is described by Parker and Hergert in an article entitled "Simultaneous Convergence—A New Concept in Headbox Design," TAPPI/October 1968, vol. 51, No. 10, pages 425–432, where a bank of downstream-converging flexible vanes oriented one above the other parallel to the slice direct a stock flow from a tube bank distributor to the slice to achieve small-scale turbulence in a fiber suspension; the intent stated in this article is to develop a uniform dispersion of the fibers with smaller but *less* intense turbulence (underline added).

Those who would rectify the stock flow in or prior to the slice nozzle would appear to be at variance with another group proposing to vary the direction of flow exiting from or following the slice. Thus, Metcalf, in *1912*, proposed an arrangement illustrated in Pat. No. 1,152,747, in which two horizontally arrayed layers of box-like passages one above the other would direct the flow of stock to the forming wire in layers having directions about 90° apart, each making an angle of 45° to the line of flow of the stock. Corcoran 1,974,103 proposed to do likewise with ribbed blades, one above the other, through which the stock would flow. Boettinger 2,394,509 proposes four layers of passages similar to those of Metcalf but in the slice itself for making a multi-layer paper. Bennett in 3,269,892 lays a pattern of protuberances in the nature of fish-like scales on the apron in order to interlace the stock fluid issuing from the slice.

This wide variation of attempts to solve the ever-present problem of furnishing stock in a flow containing the desired intensity of fine-scale or micro-turbulence illustrates the complexity of the problem.

GENERAL NATURE OF THE INVENTION

In the present invention, a pulp slurry is supplied to the slice via a plurality of parallel flow paths that are arrayed contiguously side-by-side in the cross machine direction. While flowing in those paths, the stock is given a high degree of both large scale currents and exceptionally intense fine-scale currents or micro-turbulence; the words "exceptionally intense" are here intended to mean an intensity of fine-scale currents or microturbulence that is substantially greater than any intensity of the same heretofore achieved using only the friction between tube walls and the slurry. Each flow path has a cross-sectional area (i.e.: transverse to the flow direction) that rotates progressively, as a function of location in the path, about an axis that is parallel to the path and is located at one side of the cross-section in any plane transverse to the flow direction. Preferably, each flow path has a non-circular cross-sectional area which is equal in all planes transverse to the principal path of propagation of slurry in it, that is, throughout its length, but the shape of the cross-section is gradually and continually changing (e.g.: from rectangular to triangular and vice-versa) as a function of location in the path. The stock is preferably discharged from the parallel flow paths into a short common pre-slice flow chamber wherein it is rectified to eliminate the large scale currents and any eddies that might cause cross-flow currents within the slurry jet issuing from the slice, but while simultaneously still preserving the high degree of fine-scale or microturbulence imparted in the prior flow-paths. The stock is then discharged through the slice in a jet which is wide and flat, and which retains its transverse-flow dimensions for a substantial distance, at least several feet, downstream from the slice.

Preferably rectification is done with a vane or vanes oriented parallel to the slice opening and extending continuously in the cross-machine direction. Alternatively, rectification may be done by vertical plates between the top and bottom surfaces of the flow chamber which are short extensions of the boundary walls between the parallel-motion-inducing flow paths.

The flow paths are preferably realized in a tube that is square in cross-section. According to the preferred construction, each such tube contains one or a series of spin-inducing vanes dividing the interior of the tube into two parallel flow paths for forcing the pulp slurry flowing in it to spin around an axis that is parallel to the direction of flow. This induced spin and the constantly changing cross-sectional shape of each flow path combine their effects to produce the exceptionally intense micro-turbulence in the pulp slurry. It is a principal object of the invention to induce the maximum amount of fine-scale turbulence that can be produced in the flow paths by static means or otherwise. While some turbulence will result from forcing the pulp slurry through flow paths confined in tubes (round or square), it has been found in developing the present invention that the process of imparting exceptionally intense microturbulence to a pulp slurry according to the present invention provides an unpredictable improvement in the slice jet. Thus, for example, two jets of the same bleached softwood Kraft stock at 1.8% consistency, each six inches wide and one centimeter thick, were discharged at the flow rate of 1300 feet/minute from a flow system made up of six one-inch square cross-section tubes arrayed side by side and discharging into a six-inch wide by one-inch high pre-slice flow chamber having a six-inch long, horizontal rigid rectifier vane immediately following the tubes, located equi-distant between the top and bottom walls and extending the full width of the chamber, followed by a one foot long slice chamber providing a gradual taper between the top and bottom walls to a spacing of one centimeter. The only difference between these two jets was that in forming one of them, micro-turbulence generators in the form of two spin-inducing vanes were sequentially located in each of the flow-path tubes, whereas in forming the other the tubes were clear. The results were as follows:

*Without Micro-turbulence Generators.*—the slice jet width contracted from 6 inches to 4 inches within 3 feet downstream from the slice; it contracted further to about 2 inches at about 6 feet from the slice.

*With Micro-turbulence Generators.*—the slice jet width did not contract noticeably for the entire 6 feet of its free flight. Without being bound by or to any theory as to why this action occurs, it is thought that the present invention, by creating an exceptionally high degree of intense micro-turbulence in the stock flow, and thereafter quickly eliminating the large scale currents without any significant diminution of the exceptionally itnense micro-turbulence, prevents normal surface tension forces from operating for at least six feet downstream from the slice. This result suggests that the jet which passed through the micro-turbulence generators and which contains the exceptionally intense micro-turbulence will maintain its fibers dispersed as uniformly as possible considerably longer than the one which did not pass through the micro-turbulence generators. This will allow stock flow systems to run at a considerably higher consistency to form a sheet of a given degree of uniformity, and as a result of the reduced requirement for water, makes the invention an improvement in the anti-pollution needs of the environment.

As will be appreciated as this disclosure proceeds, the present invention is also an improvement in so-called thin-channel headbox systems. Prior thin-channel headboxes have suffered from disintegration of the jet not very far (i.e., within one foot) downstream from the slice (see Parker and Hergert, above cited, page 428, column 3). The present invention, however, provides a jet which retains its form for at least six feet after leaving the slice.

Among other improvements provided by the invention because of its ability to form a sheet of a given uniformity from a relatively high consistency stock are higher retention of fines, particles, fillers and other additives and, better uniformity of their top-to-bottom distribution, which is most important in single-wire Fourdrinier machines. These and other advantages and features of the invention will be apparent in the description of exemplary embodiments of it which follows.

DESCRIPTION OF EMBODIMENTS

This description refers to the accompanying drawings, in which:

FIG. 1 is a schematic side sectional view of a flow system according to the invention.

FIGS. 1A, 1B and 1C are diagrammatic sectional views of FIG. 1 taken, respetcively, on lines 1A—1A, 1B—1B, and 1C—1C;

FIG. 2 is a longitudinal sectional schematic view of a static spin-inducing member which may be used in practicing the invention, shown in a simplified form to aid in explaining the invention;

FIGS. 2A to 2E, inclusive, are removed sections of FIG. 2;

FIG. 3 is a longitudinal schematic section of a preferred flow-control structure in a flow tube of square cross-section;

FIGS. 3A–3E, inclusive, are removed sections of FIG. 3;

FIG. 4A is a schematic side view of FIG. 3;

FIG. 4B is a schematic top view of FIG. 3;

FIG. 5 is a simplified schematic representation of the embodiment of FIG. 1;

FIG. 6 is a top view of a schematic illustration of an array of flow paths to form a flow system, and;

FIG. 7 is an isometric view, partly broken away, of a practical realization of the system illustrated in FIG. 6.

FIGS. 1–6 inclusive, show the general layout of a flow system according to the invention. A slice nozzle 10 defined by converging top and bottom walls 11 and 12, respectively, is preceded by a pre-slice flow chamber 14, which in turn is preceded by an array of flow path tubes 15. The flow path tubes 15 are bounded by a top wall 16, a bottom wall 17 and side walls (to be described) which together define an array of tube 15 of rectangular, preferably square, cross-section. As will be explained, the top and bottom walls 16 and 17 (but not the side walls) extend beyond all the flow path tubes 15 to form top and bottom boundaries of the pre-slice flow chamber 14, and these walls join the slice walls 11 and 12, respectively.

First and second static members 21 and 22 are located in each of the flow path tables 15, for sequentially inducing a spinning motion to pulp slurries flowing therein toward the slice nozzle 10. These members are illustrated schematically in FIG. 1, and are described in greater detail below with reference to FIGS. 2 and 3. Each of these members is a vane extending transversely entirely across the flow path tube and longitudinally in the direction 30 of stock flow. The first spin-inducing vane 21 has an up-stream transverse boundary 21.1 and a down-stream transverse boundary 21.2 each of which is oriented normal to and extends between the top and bottom walls 16 and 17, respectively, midway between the side walls 18 and 19, the up-stream boundary 21.1 being shown in FIG. 1A. Between these boundaries, the vane 21 is warped around an axis (not shown) which is parallel to the flow direction 30 so that the orientation of the vane transverse to the flow direction progressively rotates about said axis with respect to displacement along the direction of flow, the amount of rotation being, in the present example, 180° from the up-stream transverse boundary 21.1 to the down-stream transverse boundary 21.2. This rotation is counter-clockwise, or left-handed, as viewed from the plane containing line 1A—1A in FIG. 1, and such rotation is represented by an arrow 31 in FIGS. 1 and 1A.

The second spin-inducing vane 22 is located down-stream of the first, and has an up-stream transverse boundary 22.1 and a down-stream transverse boundary 22.2, each of which is oriented parallel to and midway between the top and bottom walls 16 and 17, respectively, and normal to and extending between the side walls 18 and 19, the up-stream boundary 22.1 being shown in FIG. 1B. A short free space (not marked) is left between the down-stream boundary 21.2 of the up-stream vane 21 and the up-stream boundary 22.1 of the down-stream vane 22. The down-stream vane 22 is warped similarly to the up-stream vane but in an opposite sense, or clockwise as seen looking down-stream from a plane containing line 1B—1B, indicated by an arrow 32 in FIGS. 1 and 1B, and the rotation of its orientation across the flow direction with respect to displacement along the direction of flow is 180° from its up-stream to its down-stream boundary. Thus, in this illustration stock flowing in the flow path tube 15 will bé subjected first to a force causing the stock to spin in a counter-clockwise direction around its direction of flow, and then to a force causing the stock to spin in a clockwise direction around its direction of flow.

A rectifier vane 23 is located in the pre-slice flow chamber 14, substantially to eliminate spin and other cross currents in the stock prior to its delivery to the slice nozzle 10. The preferred embodiment of the rectifier is a flat vane which is mounted parallel to the top and bottom walls 16 and 17, and therefore essentially parallel to the slice nozzle 10. As FIG. 1C illustrates, the side walls of all the flow path tubes 15 except those that are outermost end where the pre-slice chamber 14 begins (this will be described more fully as the description proceeds), so that a view looking toward the slice nozzle from the plane containing line 1C—1C will show only the top and bottom walls 16 and 17 with the rectifier vane 23 between them.

Another embodiment of the rectifier (not shown) is a parallel series of vertical plates, between the top and bottom walls 16 and 17 of the pre-slice flow chamber, which plates are extensions of the walls separating the parallel flow path tubes 15 wherein the exceptionally intense microturbulence is induced into the stock. This embodiment will be better understood from the description of FIG. 7 which follows later.

In the interest of a more thorough explanation of the invention, reference is now made to FIGS. 2 to 4 inclusive. FIG. 2 shows a longitudinal section of a vane 40 that is warped around its longitudinal axis 41—41 so that its orientation across that axis rotates through 180° from its upper transverse boundary 42 to its lower transverse boundary 43. This degree of rotation is indicated by transposed letters A and B at the ends of those boundaries. This vane 40 will fit into a cylindrical conduit 45 and, as will soon be appreciated, is chosen for illustration because of its simplicity relative to a similar vane that is suitable for use in a conduit of square cross-section. FIG. 2A shows the posture of the vane in the cylindrical conduit 45 at the upper transverse boundary 42, this posture being arbitrarily chosen as horizontal in FIG. 2; the letters "A" and "B" are at the left and right-hand ends, respectively. Now, moving down the vane to a position at the transverse line 46 (about ¼ the distance along the axis 41—41) it is seen that the vane has been warped about 45° around the axis, so that its orientation across the axis is now as shown in FIG. 2B. Still further down the vane half-way between its transverse boundaries 42 and 43, at transverse line 47 the vane is now oriented as shown in FIG. 2C, indicating a total warp or twist of 90° from the orientation of the upper transverse boundary. Still further down the vane, at line 48 which is located about ¾ of the distance from the upper transverse boundary to the lower, the vane has been warped 135° and this is illustrated in FIG. 2D. Finally, FIG. 2E shows the complete reversal of orientation resulting from warping the vane 40 through 180°. The views 2A to 2E, respectively, are all taken from the lower end, i.e.: looking along the axis 41—41 from the lower transverse boundary 43 to the upper transverse boundary 42.

A warped vane like that shown in FIG. 2, if installed in a cylindrical conduit, with its axis 41—41 coincident with the cylinder axis of the conduit and its transverse dimension touching the walls of the conduit as shown in FIGS. 2A–2E, will cause a fluid flowing in the conduit to spin around the axis of flow. This is the principle of construction of the spin-inducing vanes 21 and 22 in FIG. 1. Those vanes, however, are installed in conduits having a square cross-section, and reference is now made to FIG. 3 and FIGS. 3A–3E, inclusive, for details peculiar to that structure.

In FIG. 3 a vane 50 is shown in longitudinal section. Like the vane 40 in FIG. 2, this vane is warped around its longitudinal axis 51—51 so that its orientation across that axis rotates through 180° from its upper transverse boundary 52 to its lower transverse boundary 53. The letters "A" and "B" have the same significance as in FIG. 2. FIGS. 3A to 3E show removed section views of this vane 50 as installed in a conduit 55 of square cross-section, taken, respectively, at the plane of the upper transverse boundary 52, at lines 56, 57, 58 and at the plane of the lower transverse boundary 53. FIGS. 3A to 3E, inclusive, correspond respectively to FIGS. 2A to 2E insofar as they show how the orientation of the vane 50 rotates about the axis 51—51 as a function of location along that axis. It will be seen, however, that the length of the transverse dimension of the vane also changes as a function of location along the axis, being longest when the vane is diagonally oriented in the conduit 55 (FIGS. 3B and 3D) and shortest when the vane is oriented normal to two opposite walls (FIGS. 3A, 3C and 3E). The sectional view of FIG. 3 also reflects this difference, and it will be seen that this vane cannot be illustrated with simple helical lines. FIGS. 4A and 4B schematically represent a spin-inducing vane such as vane 50 in a square cross-section conduit 55, as seen from two adjacent sides of the conduit that are joined at a right angle. FIG. 4A is, in effect, a side view of FIG. 3, as seen from the left in FIG. 3, showing at left the "A" end of the upper transverse boundary 52 and at the right the "B" end of the lower transverse boundary 53. Lines 61 represent the position of the "A" side, and line 62 the position of the "B" side of the vane as its orientation is rotated with respect to displacement along the axis 51—51 toward the lower transverse boundary 53. At a position of 45° rotation the vane is oriented with the "A" and "B" sides in the corners of the conduit (see FIG. 3B) and the "A" and "B" sides can no longer be "seen" in FIG. 4A until they "reappear" emerging from respectively opposite corners (FIG. 3D) as line 61' (for the "A" side) and lines 62' (for the "B" side of the vane). Assuming that FIG. 4A is a side view, the lines 61, 62 and 61', 62' appear to be moving diagonally along side walls of the square conduit 55. Similarly, in FIG. 4B, which essentially duplicates FIG. 3, and which may be regarded as a "top" view, lines 61 and 62 are "seen" to move diagonally across the top and bottom walls, respectively, of the square conduit 55. Schematic representations like those of FIGS. 4A and 4B are used in FIG. 1 to represent the two spin-inducing vanes 21 and 22.

FIG. 5 illustrates a unit of the flow system of FIG. 1 with a further schematic simplification. Each spin-inducing vane 21, 22 of FIG. 1 is represented in FIG. 5 by a set of crossed lines 71 or 72, respectively, extending diagonally across the square cross-sectional flow path tube 15. The crossed lines 71 or 72 do not show the spin direction, and it will be understood that the showing of one set 71 followed by another 72 indicates the preferred arrangement of first one spin direction and then the opposite. The rectifier vane 23 follows immediately the second spin-inducing vane 72 which again will preferably have its down-stream transverse boundary (shown in FIG. 1 but not in FIG. 5) parallel and contiguous to the up-stream edge 23.1 of the rectifier vane. A space 65 is left between the spin-inducing vanes 71, 72. A square-to-round cross-section tubular conversion member 68 is fitted to the up-stream end of the square-cross-sectioned tubular structure defining the flow path tube 15. The upper wall 16 may be bent around a line 69 to form the upper slice wall 11.

FIG. 6 shows an assembly of units like FIG. 5 arrayed side by side to provide a plurality of individual flow path tubes 15 leading into a common pre-slice flow chamber 14 and thence to a slice nozzle 10 elongated in the cross-machine direction 75. The top walls 16 are arrayed edge-to-edge in register to form in effect a common top wall. The bottom walls (not shown) are similarly united. The outermost side walls 18 and 19 extend together with the top and bottom walls to form side wall boundaries for the pre-slice nozzle flow chamber 14 and the slice walls 11 and 12, but all other intervening side walls of the flow path tubes 15 terminate downstream at the start of the pre-slice flow chamber 14, coincident with the up-stream edge 23.1 of the rectifier vane 23. The rectifier vane extends continuously across the pre-slice flow chamber from one outer side walls 18 to the other 19. The square-to-round tube conversion members 68 extend up-stream to mate with furnish-supply conduits 81.

FIG. 7 illustrates in a partially broken-away isometric projection a practical realization of a flow system according to the invention. The view is taken looking up-stream from line 7—7 in FIG. 6, the slice walls 11, 12 and slice nozzle 10 being omitted to simplify the illustration. A top wall 161 and a bottom wall 171 serve in common as the top and bottom walls, respectively, of each of the flow path tubes 15. The outermost end wall 19 is shown partly broken away to reveal in a somewhat schematic fashion the interior of the nearest of the flow path tubes 15. The down-stream half of the second spin-inducing vane 22 (FIG. 1) is illustrated, showing the "B" edge of the vane approaching the down-stream transverse boundary 22.2, which meets and registers with the up-stream edge 23.1 of the rectifier vane 23. The upper wall 161 is broken away, and the rectifier vane 23 is cut away, to reveal the down-stream transverse boundaries 22.2 of several spin-inducing vanes 22 in respective adjoining flow path tubes 15, and to show common side wall-members 198 extending between the upper and lower walls 161 and 171 to provide common walls between adjacent pairs of flow paths. Thus, each common side-wall member 198 is marked 18 on one side and 19 on the other, to indicate the side wall that it provides for each adjoining flow path tube 15. The common side wall members 198 terminate in the same plane as the down stream transverse boundaries 22.2 and therefore, in this embodiment of the invention, do not extend into the pre-slice flow chamber 14. In an embodiment using a parallel series of vertical plates for rectification the side wall members 198 can extend into the pre-slice flow chamber 14, as is shown in dashed lines at 199; in that case the horizontal rectifier may be omitted, or it can be used in combination with the vertical rectifiers. The square-to-round tube conversion members 68 are alternately oriented at oppositely-angled directions up-streamward, to form two interdigitally-diverging sets of stock input conduits. This arrangement facilitates coupling to them the supply conduits 81.

A flow system according to the invention may be used in place of a headbox of any paper machine, for example, a Fourdrinier machine of the single-wire or the double-wire type, or a vertical-forming machine.

While it is presently preferred to employ flow, path tubes, of square cross-section in practising the invention, it will be understood that flow path tubes having other non-circular cross-sections may also be used. In some cases, one may elect to use tubes of round cross-section such as tubes 45 shown in Figure 2. The warped-vane static microturbulence generators 21, 22 or 71, 72, whether in the form 40 (Figure 2) or 50 (Figure 3) are but examples of a presently preferred form of microturbulence generators that works; when two or more are used in a single flow passage 15, they need not be end-to-end contact with each other. The invention is not limited to any of those details. Thus, for example, since the invention induces both large-scale currents and fine-scale turbulence within the flow paths immediately preceding the pre-slice flow chamber 14, the lengths of the conduits 81 are not critical, and these conduits may be made as short as is feasible; indeed the invention envisions a flow system in which the manifold system couples directly to the flow path tubes 15.

I claim:

1. A method of supplying stock to a paper making machine comprising the steps of establishing a flow of stock in a plurality of parallel flow paths, directing the stock in each flow path to change its cross-sectional shape alternately between quadrangular and triangular without substantially changing its cross-sectional area while flowing therein so as to produce fine-scale turbulence in the stock flowing in each path, and discharging the stock from all of said paths into a common slice nozzle.

2. A method according to claim 1 including the further steps of directing the stock in each flow path to rotate about an axis parallel to its direction of flow as it flows in said path, and rectifying the stock flow emerging from said flow paths to minimize eddy currents with minimum reduction of said fine-scale turbulence, prior to delivery of said stock to said slice nozzle.

3. In a flow system for supplying liquid slurry to a web-forming machine comprising a slice nozzle and means upstream of said nozzle defining a plurality of parallel-connected flow paths through which to furnish said slurry to said nozzle, a flow path boundary wall configuration which defines a cross-section that has the same area in all planes transverse to the principal path of propagation of said slurry in the flow path but changes in shape alternately, gradually and continually between quadrangular and triangular as a function of location in said path.

4. A flow system according to claim 3 in which each flow path progressively rotates about an axis that is parallel to said principal path, said axis in each flow path being located in all said planes at one side of said cross-section, for imparting to slurry flowing in each path a component of motion transverse to the direction of flow.

5. A flow system according to claim 4 including a pre-slice flow chamber located between the down-stream ends of said flow paths and said slice nozzle, and in said chamber rectifying means for minimizing transverse currents in the slurry flow emerging from said flow paths.

6. In a flow system for a liquid slurry, means for conveying a slurry to a point of delivery including tubular means having walls defining a flow path of confined cross-sectional area, said walls being shaped to define successive zones of essentially uniform cross-sectional area and differing cross-sectional configuration which changes alternately between quadrangular and triangular as a function of location in said path.

7. In a flow system according to claim 6 means to impart to slurry flowing in said path a component of motion to rotate the slurry around said path.

8. A micro-turbulence generator for use in a flow system for a liquid slurry comprising a tube of quadrangular cross-section, means to divide the interior of said tube into at least two separate flow paths of confined cross-sectional area, each flow path having essentially uniform cross-sectional area and cross-sectional configuration which changes progressively and alternately between quadrangular and triangular along the path.

9. A micro-turbulance generator for use in a flow system for a liquid slurry comprising a tube of non-circular cross-section and having a longitudinal axis, a partition vane member within the tube extending from wall-to-wall transverse to said axis and dividing the interior of the tube into two parallel mutually-isolated flow path having substantially the same cross-sectional area, said partition member being warped around an axis of rotation that is parallel to said longitudinal axis so that its orientation transverse to said longitudinal axis progressively rotates around said axis of rotation along said paths, each flow path having a cross-sectional area which is essentially uniform throughout its length but differs in configuration alternately between quadrangular and triangular along the path.

10. In a flow system for supplying liquid slurry to a web-forming machine, a slice nozzle, and means for conveying a slurry to said nozzle including a tube of non-circular cross-section, means to divide the flow within said tube into at least two flow paths of confined cross-sectional areas, eatch of said flow paths being bound by walls defining shifting zones of essentially uniform cross-sectional area and differing cross-sectional configuration which changes alternately between quadrangular and triangular.

11. In a flow system for supplying a liquid slurry to a web-forming machine, a slice nozzle, and means for conveying a slurry to said nozzle including tubular means having walls defining a flow path of confined cross-sectional area, said walls being shaped to define shifting zones of essentially uniform cross-sectional area and differing cross-sectional configuration which changes alternately between quadrangular and triangular.

12. A method of supplying stock to a paper making machine comprising the steps of establishing a flow of stock in a plurality of parallel flow paths, imparting a spinning motion to substantially all of the stock flowing in each of said paths for inducing both large scale and fine-scale turbulence in the stock flowing in each of said paths, discharging stock from all of said flow paths into a pre-slice flow chamber, rectifying the flow in said pre-slice flow chamber by selectively removing substantially all the spinning motion component substantially to eliminate selectively said large scale turbulence with minimum reductions of fine-scale turbulence, and discharging the rectified stock through a slice.

13. A method according to claim 12 comprising the step of rectifying the flow with a vane in the pre-slice flow of rectifying the flow with a vane in the pre-slice flow chamber that extends in the cross-machine direction parallel to the slice opening.

14. A method according to claim 12 comprising the steps of inducing said fine-scale turbulence by forcing stock flowing in each of said paths to spin first in one direction and then in the opposite direction.

15. A flow system for supplying liquid slurry to a web-forming machine comprising a slice nozzle and coupled to said nozzle a plurality of tubes providing separated flow paths through which to furnish said slurry to said nozzle, each tube having a transverse partition member within and extending entirely across the tube dividing the interior of the tube into two parallel flow paths, said partition member having an up-stream transverse boundary and a down-stream transverse boundary and being warped around an axis parallel to said paths so that from one of said boundaries to the other its orientation transverse to said paths progressively rotates around said abis with respect to location on said pa ths, and flow rectifier means adjacent said down-stream boundaries preceding said nozzle.

16. A flow system according to claim 15 in which each tube has a non-circular cross section, and said two flow paths in each tube have respective cross sections which change in shape gradually and continually as a function of location in the respective flow path.

17. A flow system according to claim 16 in which each tube has a square cross-section, and each flow path has a cross-section which changes in shape between rectangular and triangular.

18. Flow system according to claim 17 in which said tubes are arranged contiguously side-by-side with the top and bottom walls of each in edge-wise register with the respective top and bottom walls of its neighbor or neighbors, and each tube shares a common side wall with each of its neighbors.

19. A flow system according to claim 18 in which extensions of said top and bottom walls beyond said downstream ends in said direction of flow provide the top and bottom boundaries of said slice nozzle.

20. A flow system according to claim 15 in which each flow path has a cross section that is equal in all planes transverse to the principal path of flow of said slurry in the respective flow path.

21. A flow seystem for supplying a pulp slurry to a paper making machine comprising a slice and pre-slice flow chamber connected to said slice for directing a flow of slurry to said slice, means upstream of said pre-slice flow chamber defining a plurality of parallel flow paths disposed contiguously in a row transverse to the direction of said flow and discharging directly into said pre-slice flow chamber, means in each of said flow paths including at least one static member extending entirely across the path and extending in the direction of stock flow for applying force to spin said stock around its direction of flow so as to induce in a slurry flowing therein simultaneously both large scale currents and intense fine-scale turbulence, each said static member terminating in a downstream edge that is substantially parallel to the slice, and rectifying means in said pre-slice flow chamber including a vane parallel to the slice opening located adjacent said down-stream edge and extending in the cross-machine direction for substantially eliminating selectively said large-scale currents with minimum reduction of said fine-scale turbulence.

22. A flow system according to claim 21 in which said rectifying means includes a series of parallel vanes transverse to the slice opening arranged in the cross-machine direction.

23. A flow system according to claim 21 in which said static member in each of said flow paths is a spin-inducing vane extending transversely across the flow path in which it is disposed and longitudinally in the direction of flow of said stock therein; said vane having an up-stream transverse boundary and a down-stream transverse boundary and being warped around an axis parallel to said direction of flow so that its orientation transverse to said flow progressively rotates around said axis with respect to displacement along the direction of flow, the down-stream transverse boundary of said vane being oriented substantially parallel to said slice.

24. A flow system according to claim 21 in which said spin-inducing means includes at least first and second longitudinally-extending static members located successively in each of said flow paths, said first member being arranged to apply force to spin said stock in a first direction around said flow direction and said second member being arranged to apply force to spin said stock in the opposite direction around said flow direction.

25. A flow system according to claim 21 in which each of said flow paths is bounded by top, bottom and side flat walls defining a tube of rectangular cross-section, said tubes being arranged contiguously side-by-side with the top and bottom walls of each in edge-wise register with the respective top and bottom walls of the others.

26. A flow system according to claim 25 in which extensions of said top and bottom walls beyond said side walls in said direction of flow constitute the top and bottom boundaries of said slice.

27. A flow system according to claim 25 in which said static member in each of said tubes is a spin-inducing vane extending transversely from wall-to-wall across the tube in which it is disposed and longitudinally in the direction of flow of said stock therein, said spin-inducing vane having an up-stream transverse boundary and a down-stream transverse boundary, and being warped around an axis parallel to said direction of flow so that its orientation transverse to said flow progressively rotates around said axis with respect to displacement along the direction of flow, there being a prescribed number of degrees of rotation between said up-stream and down-stream boundaries, the down-stream transverse boundary of said spin-inducing vane being oriented substantially parallel to said slice.

28. A flow system according to claim 27 including in each of said tubes at least a first static member having substantially a 180-degree rotation between its up-stream and down-stream transverse boundaries and oriented with its said boundaries extending between the top and bottom walls of the tube, followed down-stream by a second static member having a substantially 180-degree rotation between its up-stream and down-stream transverse boundaries and oriented with its said boundaries extending between the side walls of the tube and substantially parallel to said slice.

29. A flow system according to claim 28 in which the rotations of successive static members in each of said tubes are, respectively, warped in opposite directions.

References Cited
UNITED STATES PATENTS

| | | | |
|---|---|---|---|
| 985,216 | 2/1911 | Sims | 138—39 |
| 1,610,742 | 12/1926 | Buckling | 162—343 X |
| 3,328,236 | 6/1967 | Burgess, Jr. et al. | 162—343 |
| 3,607,625 | 9/1971 | Hill et al. | 162—343 |
| 3,239,197 | 3/1966 | Tollar | 259—4 |
| 3,286,992 | 11/1966 | Armeniades | 259—4 |
| 3,328,003 | 6/1967 | Chisholm | 259—4 |
| 3,424,437 | 1/1969 | Schearer | 138—42 |
| 3,643,927 | 2/1972 | Crouch | 259—4 |

S. LEON BASHORE, Primary Examiner

R. V. FISHER, Assistant Examiner

U.S. Cl. X.R.

138—42; 162—336, 343; 259—4

UNITED STATES PATENT OFFICE
CERTIFICATE OF CORRECTION

Patent No. 3,846,229                           Dated November 5, 1974

Inventor(s) O.J. Kallmes

It is certified that error appears in the above-identified patent and that said Letters Patent are hereby corrected as shown below:

Column 4, line 51, change "itnense" to --intense--

Column 5, line 13, change "respetcively" to --respectively-- line 41, change "tube" to --tubes-- line 48, change "tables" to --tubes--

Column 7, line 7, change "principle" to --principal--

Column 8, line 14, delete "nozzle"

after "slice" insert --nozzle--

Column 10, line 12, change "areas" to --area-- line 36, change "tions" to --tion-- line 40, delete "of rectifying the flow with a vane in the pre-slice flow"

line 58, change "abis" to --axis-- line 59, change "on" to --in--

UNITED STATES PATENT OFFICE
CERTIFICATE OF CORRECTION

Page 2

Patent No. 3,846,229      Dated November 5, 1974

Inventor(s) O. J. Kallmes

It is certified that error appears in the above-identified patent and that said Letters Patent are hereby corrected as shown below:

Column 11, line 11, change "seystem" to -- system --.

Column 11, line 12, after "and" insert -- a --.

Signed and sealed this 15th day of July 1975.

(SEAL)
Attest:

RUTH C. MASON
Attesting Officer

C. MARSHALL DANN
Commissioner of Patents
and Trademarks